Nov. 30, 1937.   W. M. RYAN ET AL   2,100,874
AUTOMATIC WEIGHING AND FEEDING MACHINE
Filed Aug. 21, 1934   11 Sheets-Sheet 5
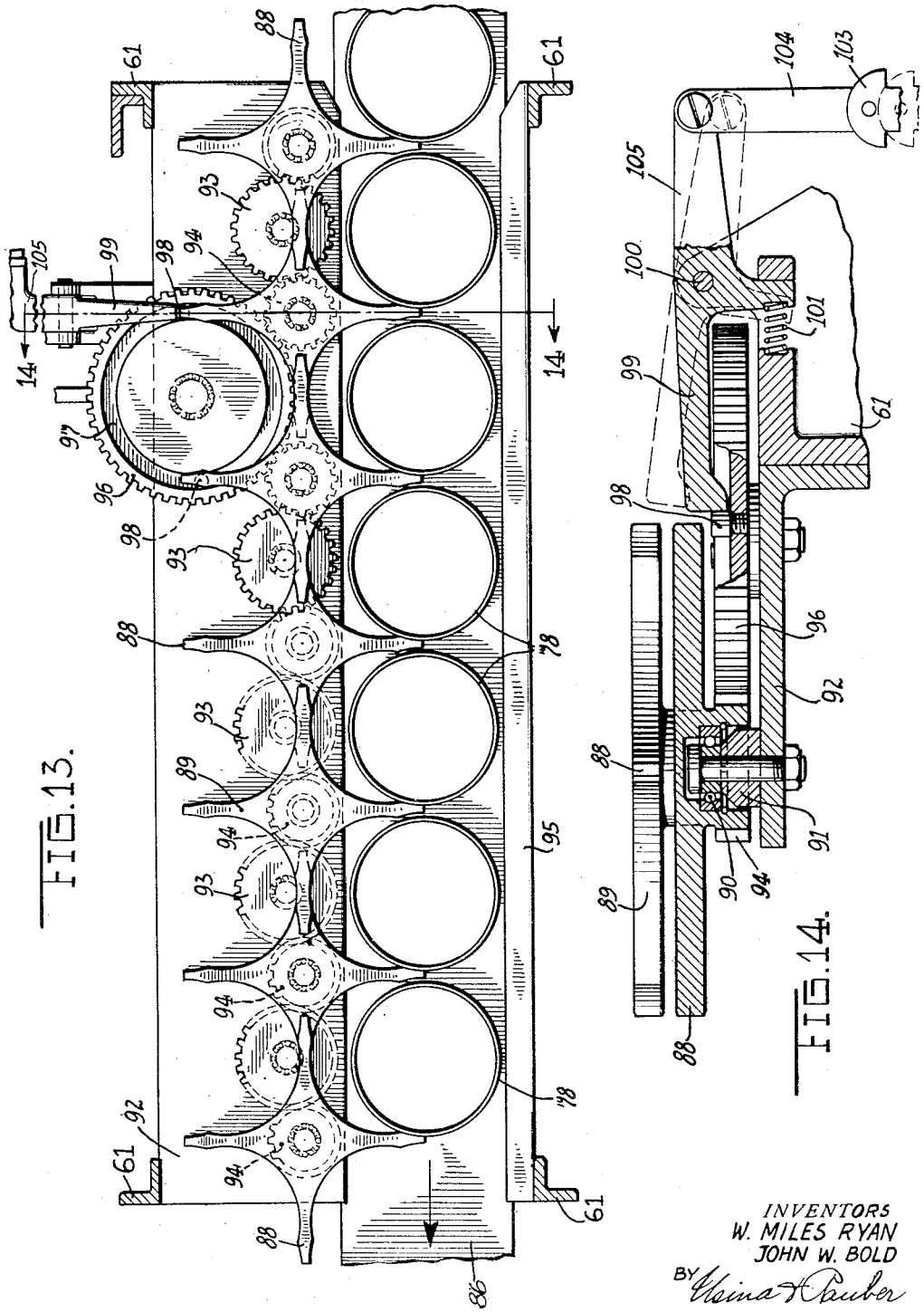

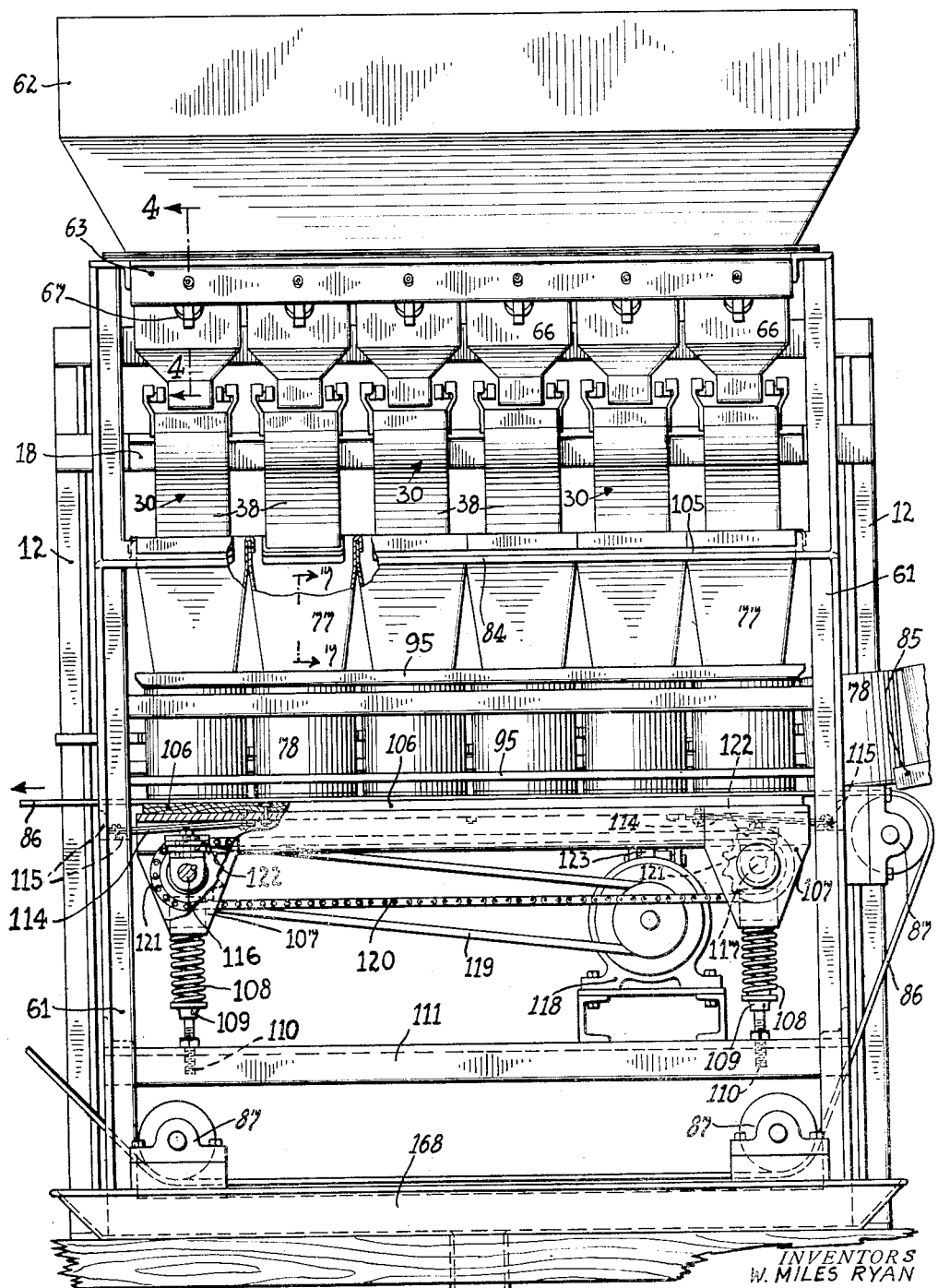

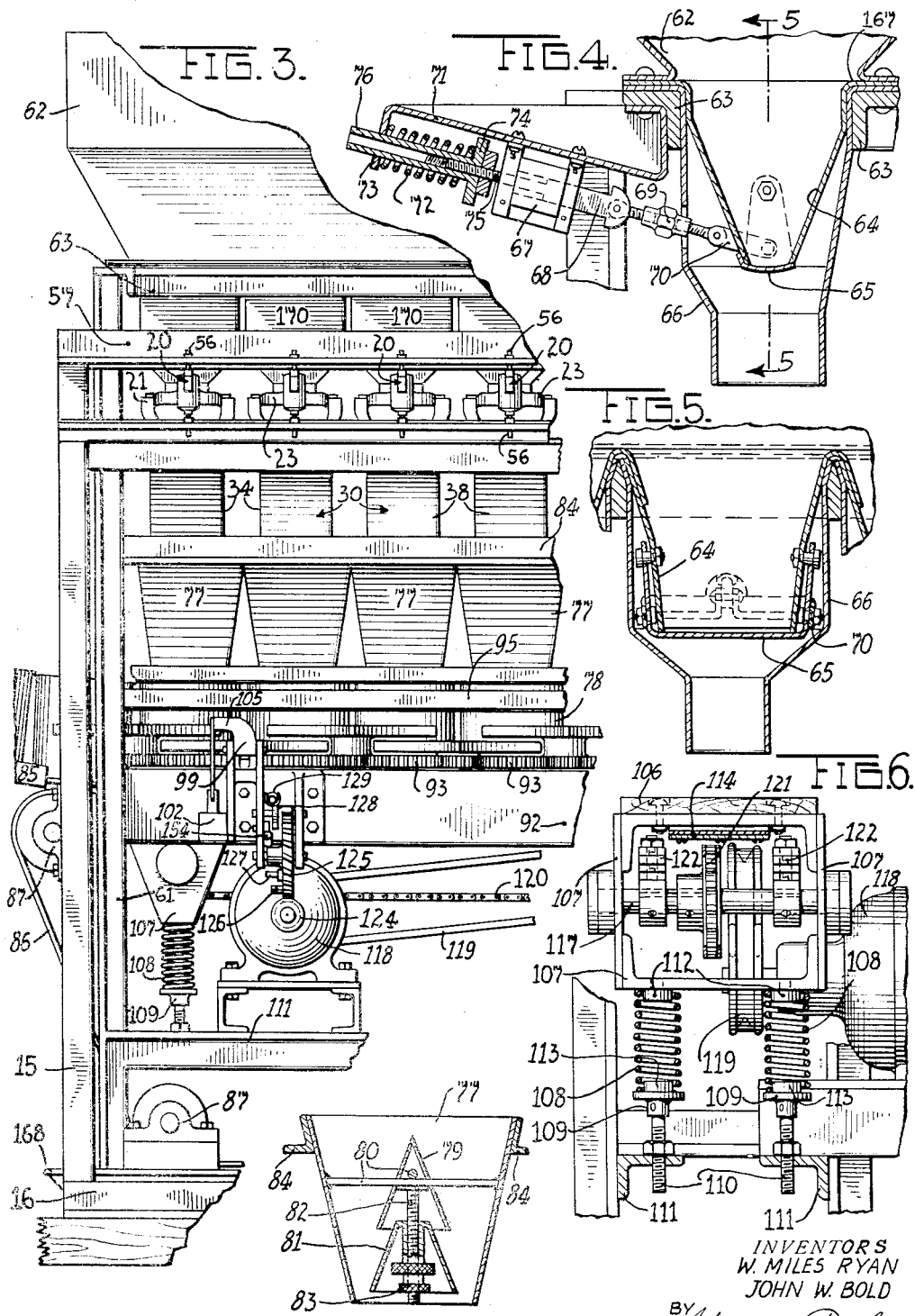

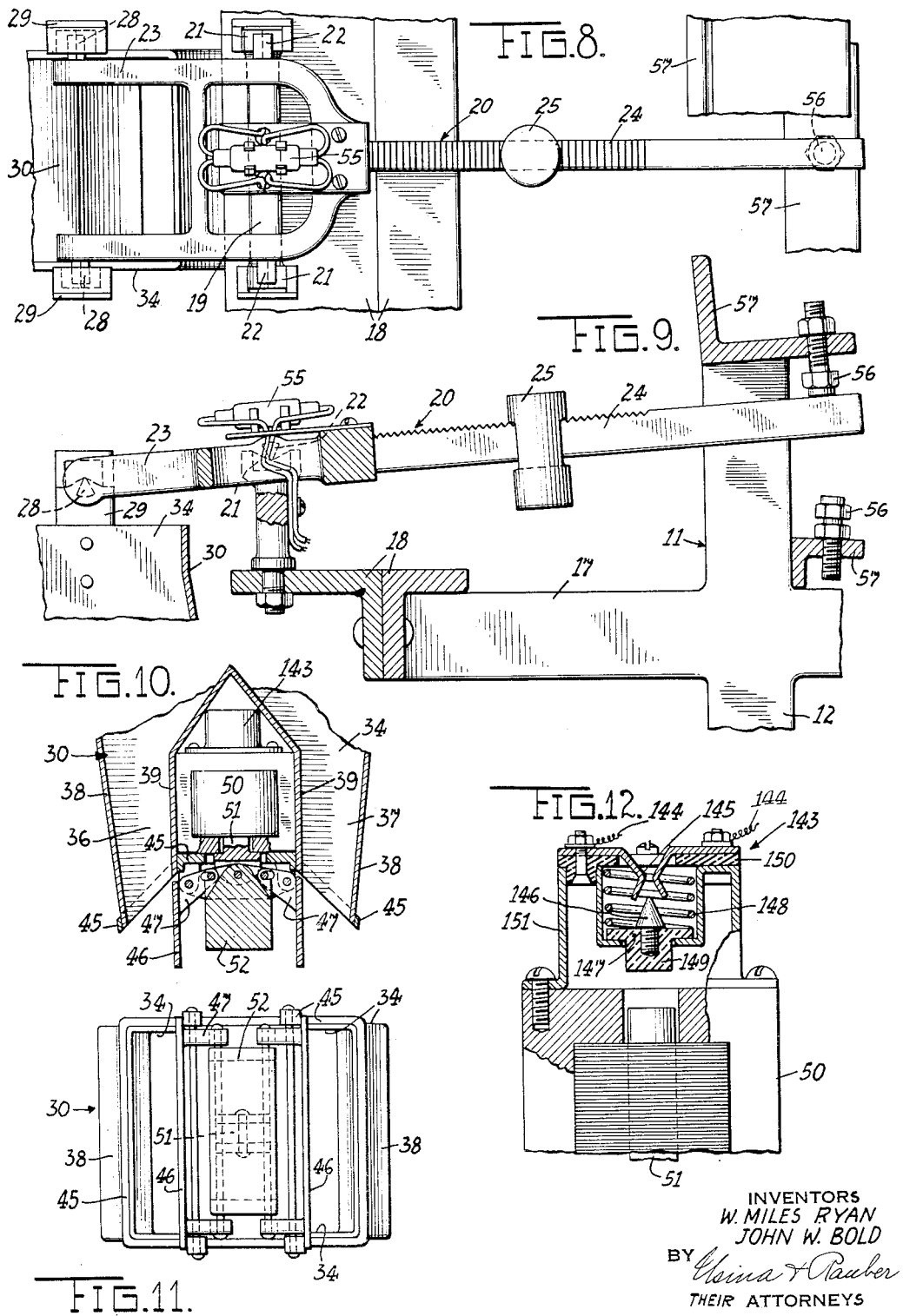

Nov. 30, 1937. W. M. RYAN ET AL 2,100,874
AUTOMATIC WEIGHING AND FEEDING MACHINE
Filed Aug. 21, 1934    11 Sheets-Sheet 6

INVENTORS
W. MILES RYAN
JOHN W. BOLD
BY
THEIR ATTORNEYS

Nov. 30, 1937.   W. M. RYAN ET AL   2,100,874
AUTOMATIC WEIGHING AND FEEDING MACHINE
Filed Aug. 21, 1934    11 Sheets-Sheet 7
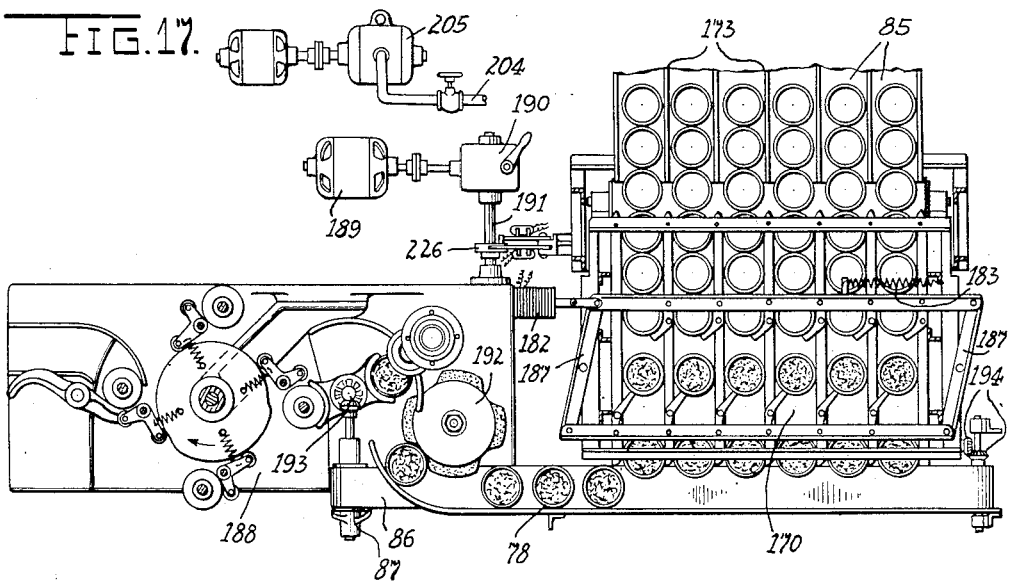
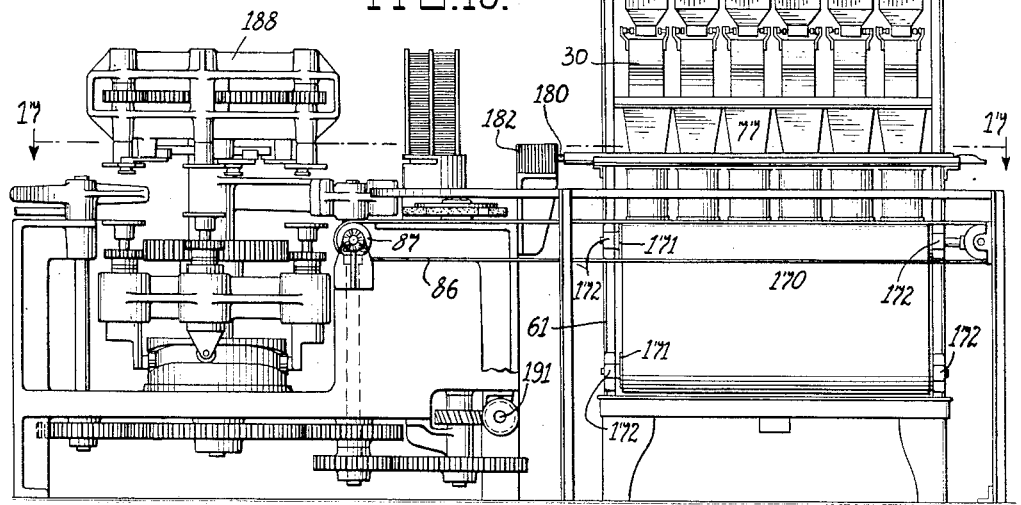
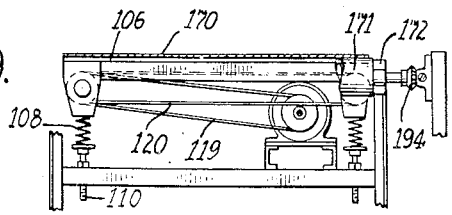
INVENTORS
W. MILES RYAN
JOHN W. BOLD
BY
THEIR ATTORNEYS

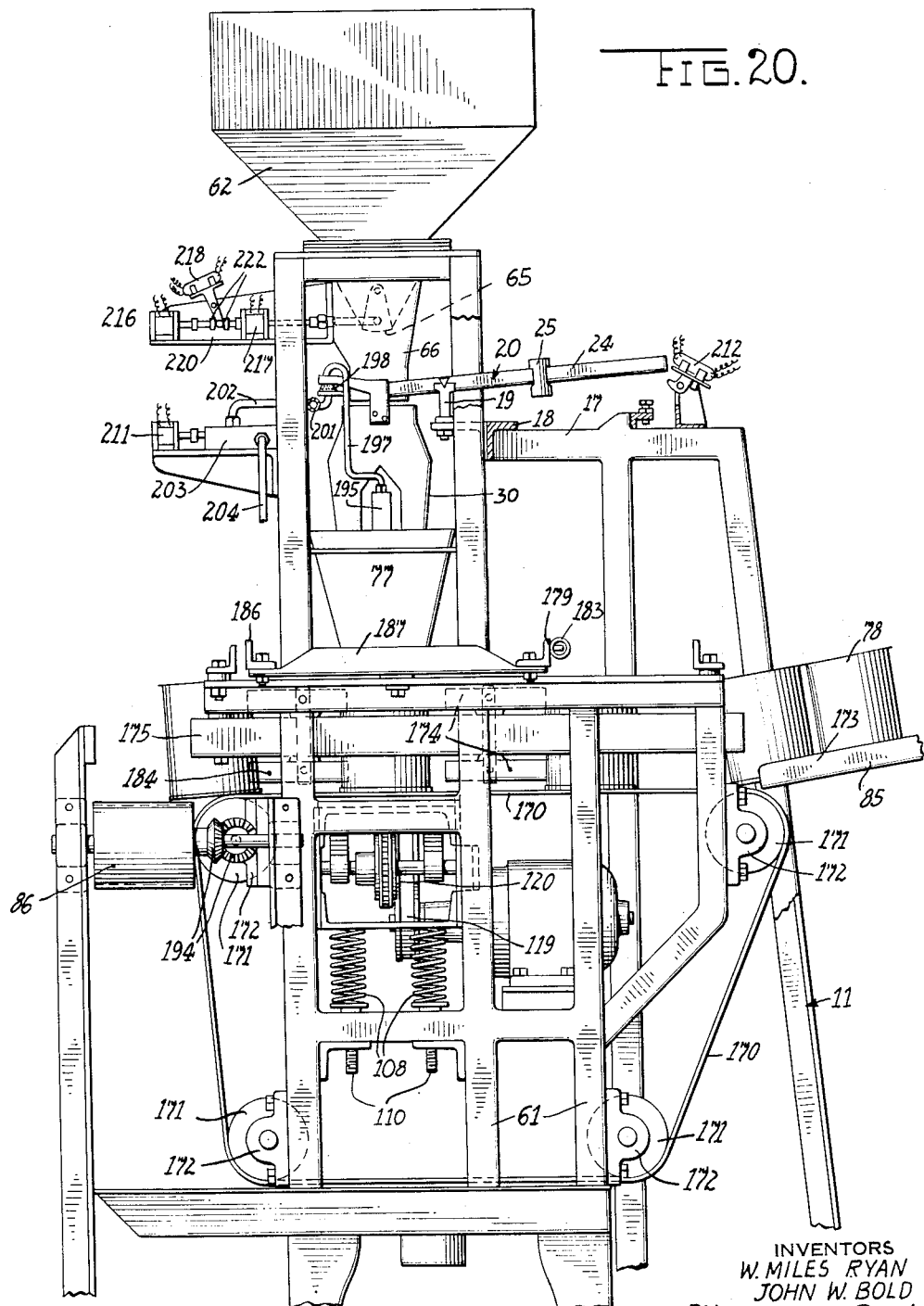

Nov. 30, 1937.  W. M. RYAN ET AL  2,100,874
AUTOMATIC WEIGHING AND FEEDING MACHINE
Filed Aug. 21, 1934  11 Sheets-Sheet 9
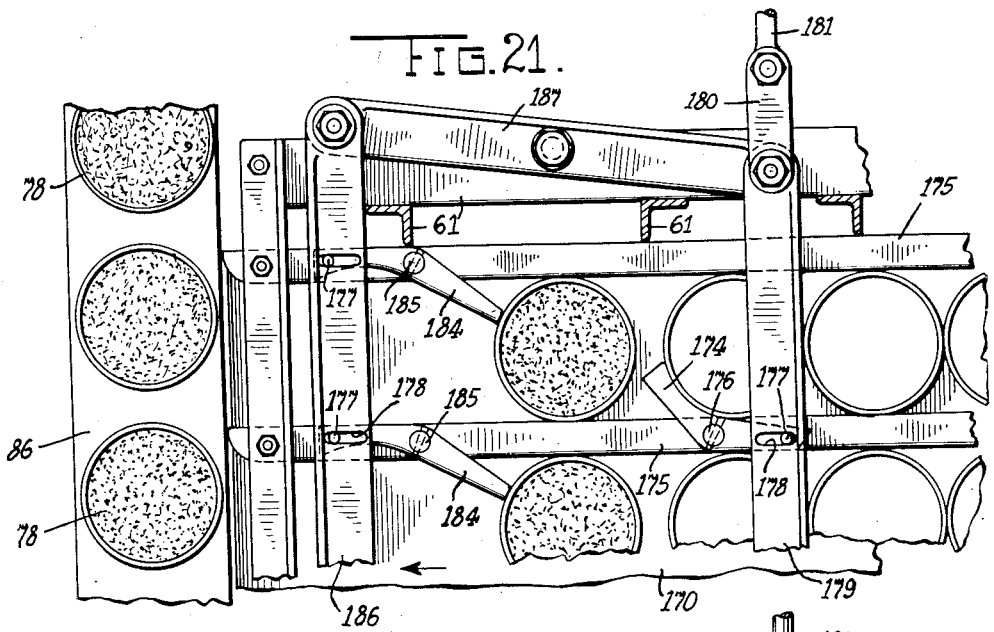
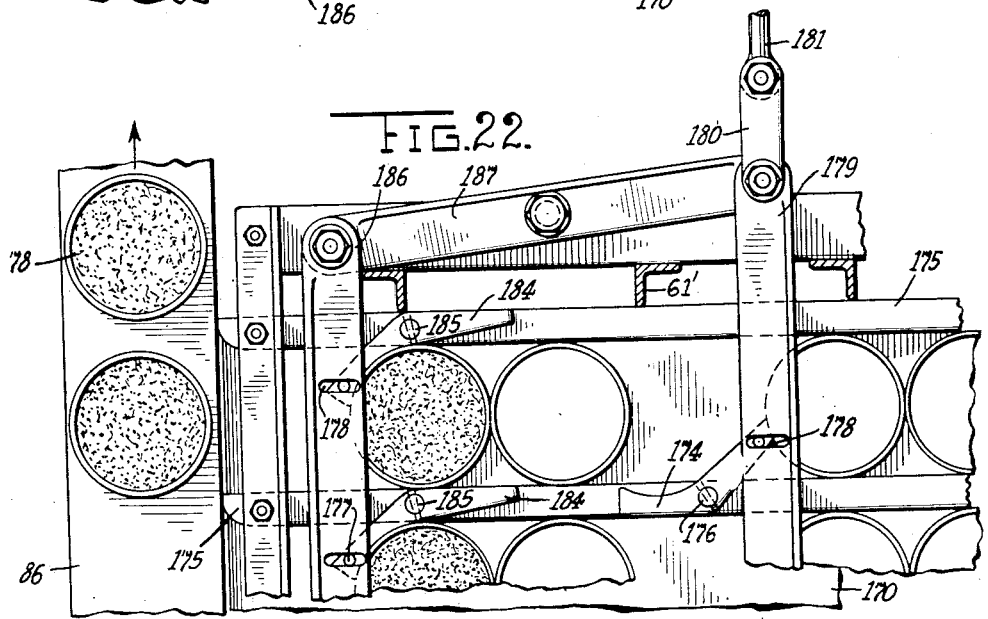
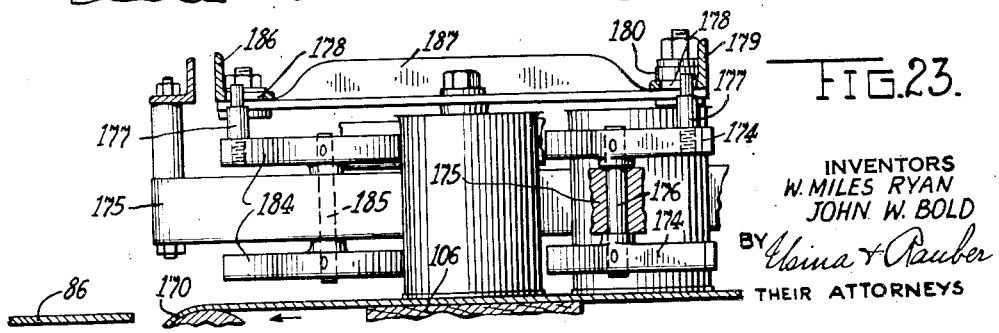
INVENTORS
W. MILES RYAN
JOHN W. BOLD
THEIR ATTORNEYS Nov. 30, 1937.    W. M. RYAN ET AL    2,100,874
AUTOMATIC WEIGHING AND FEEDING MACHINE
Filed Aug. 21, 1934    11 Sheets-Sheet 10
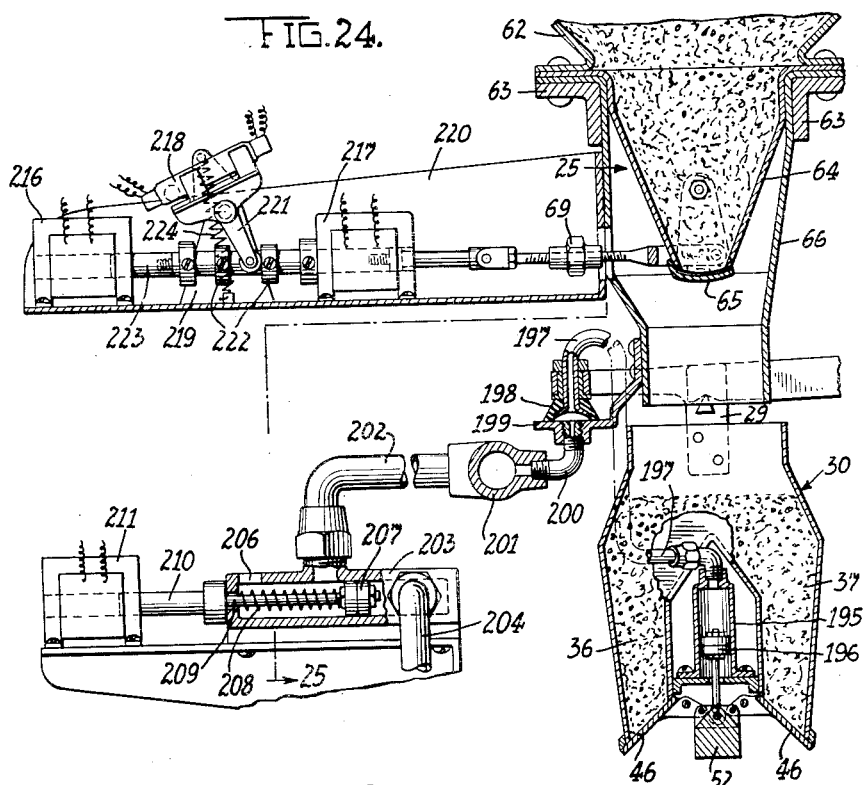
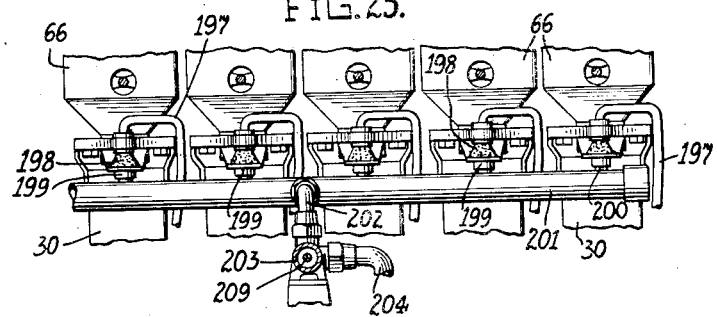
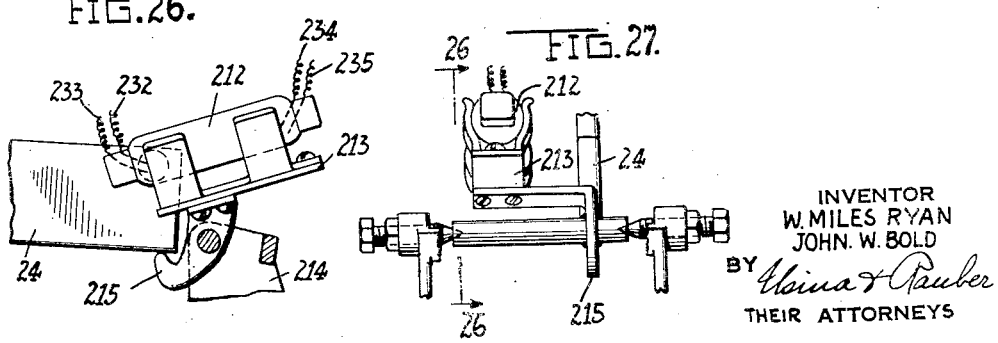
INVENTOR
W. MILES RYAN
JOHN W. BOLD
BY
THEIR ATTORNEYS

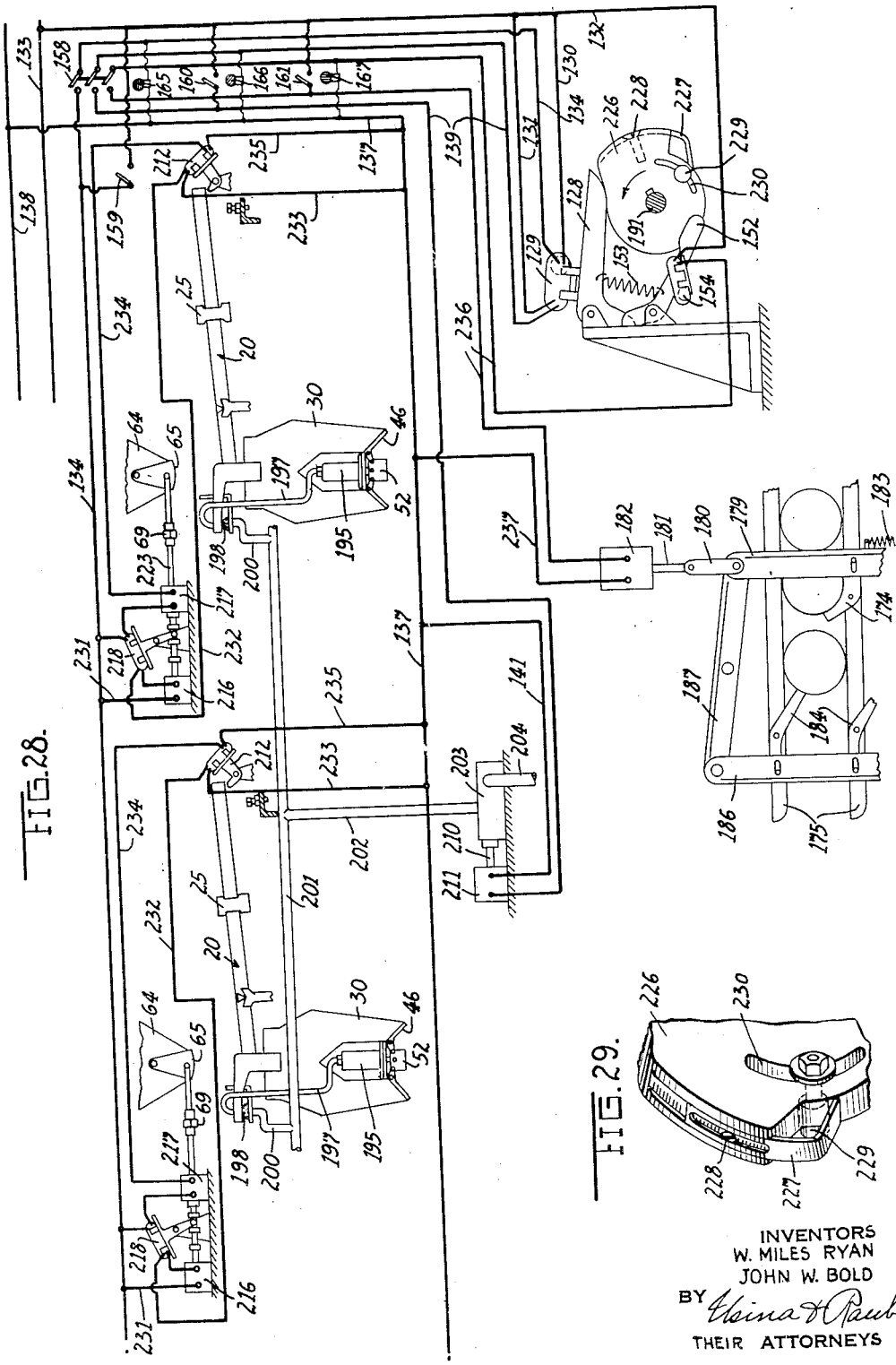

Patented Nov. 30, 1937

2,100,874

UNITED STATES PATENT OFFICE 2,100,874

AUTOMATIC WEIGHING AND FEEDING MACHINE

William Miles Ryan and John W. Bold, Brooklyn, N. Y., assignors to Ryan Coffee Corporation, Brooklyn, N. Y., a corporation of New York Application August 21, 1934, Serial No. 740,738

14 Claims. (Cl. 249—18)

Our invention relates to machines for weighing material and discharging it in successive equal quantities into successive containers for delivery to closure mechanisms or other apparatus.

The objects of the invention are to provide a weighing and filling machine in which the material is reliably, accurately and quickly filled into the containers and in which it is compacted to a small space in the containers; and to provide means whereby the machine may be controlled to speed it or retard it to synchronize with apparatus to which the filled cans are to be delivered and to vary its speed as the speed of the sealing machine varies.

The various features of the invention are illustrated in the accompanying drawings by way of example in which—

Fig. 2 is a front elevation of this machine;

Fig. 3 is a rear elevation of a part of the machine;

Fig. 4 is an enlarged sectional side view of a gate control of the machine taken on line 4—4 of Fig. 2;

Fig. 5 is a partial sectional front view of same taken on line 5—5 of Fig. 4;

Fig. 6 is a side view of a vibrating mechanism forming part of the machine;

Fig. 7 is a sectional view of a funnel on line 7—7 of Fig. 2;

Fig. 8 is a top view of one of the scale beams and mechanism of the weighing unit enlarged;

Fig. 9 is a side view of same partly in section;

Fig. 10 is a partial sectional side view of the weighing bucket;

Fig. 11 is a bottom view thereof;

Fig. 12 is a sectional side view of a solenoid operated switch;

Fig. 13 is a plan view of a grouping mechanism;

Fig. 14 is an enlarged sectional side view of part of the grouping mechanism on line 14—14 of Fig. 13;

Fig. 17 is a sectional plan view on line 17—17 of Fig. 18 of a modified weighing machine connected to a sealing machine and feeding the cans in front formation to receive the weighed material;

Fig. 18 is a front elevation of the weighing and sealing machine of Fig. 17;

Fig. 19 is a front view of the container shaking device of the weighing machine of Figs. 17 and 18;

Fig. 20 is a side elevation of the modified weighing machine;

Fig. 21 is an enlarged plan view of part of the mechanism showing a frontage formation feed of containers;

Fig. 22 shows the mechanism of Fig. 21 illustrating a different displacement of containers;

Fig. 23 is a partial side view of the frontage formation feed;

Fig. 24 illustrates a sectional side view of the hopper gate and its electrical control in conjunction with a bucket operable by a pneumatic control device;

Fig. 25 shows a partial front view of the latter on line 25—25 of Fig. 24;

Figs. 26 and 27 illustrate respective side and end views of a mercury switch operated by the end part of a scale beam;

Fig. 28 is a diagrammatic arrangement of operative features of the weighing mechanism of Figs. 17 to 20;

Fig. 29 is a perspective view of part of an adjustable cam controlling the operation of the weighing mechanism.

Figure 1:
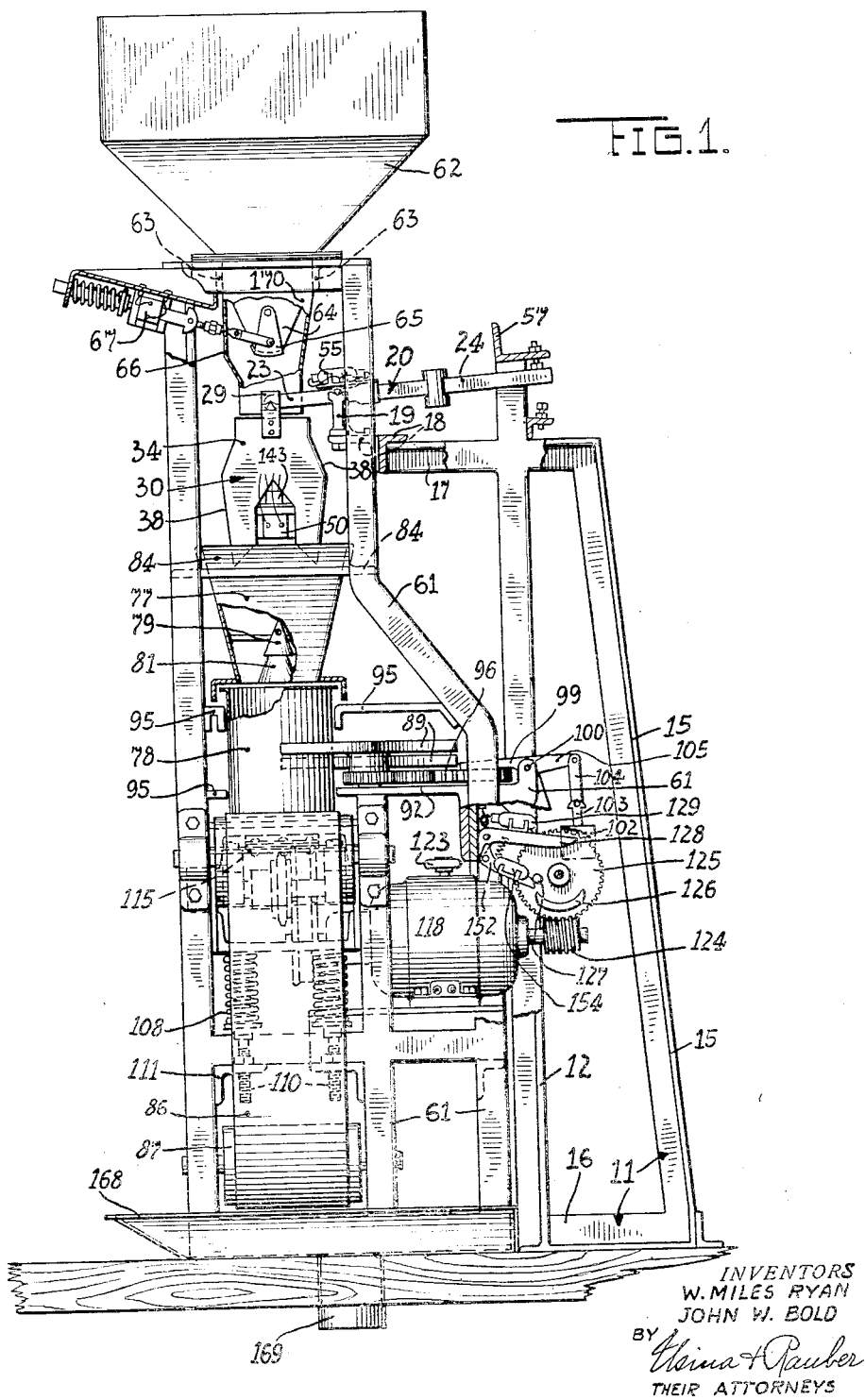
Fig. 1 is a side elevation, partly in section, of apparatus embodying our invention.

In our invention, a number of separate quantities of material are weighed and filled simultaneously by multiple units into separate cans or containers. For this purpose, the material is fed from a hopper through feeding spouts and control valves into separate weighing buckets individually suspended from arms of scale beams, there being one beam for each bucket. When the predetermined quantity of material has been fed into the bucket, its weight tilts the scale beam and, through a control mechanism, immediately stops the further supply of material to the bucket. Thereupon, delivery gates in the bottom of the buckets open on impulse from a timing device, delivering the material from each bucket through its individual chute into a can or container placed immediately below. As each bucket is emptied, its scale beam tilts back to its original position and the delivery doors are closed simultaneously by the opening of the timing circuit after a sufficient time to permit a complete emptying of the bucket. As the material is delivered into the respective containers, the latter are vibrated to compact the material in the cans as it is fed thereto. When the cans or containers have been filled, they are conveyed to the capping or sealing machine and a new group of cans is brought beneath the chutes and accurately positioned thereunder.

In one embodiment of the invention the cans are brought to position in a single fill, then stopped for a period of filling and thereafter moved in a single file to the capping or sealing machine or other apparatus for handling the filled cans.

In another embodiment of the invention, the cans are brought in a front formation, that is, in a direction at right angles to the line of the cans. The movement of the cans or containers, the opening of the delivery door from the hopper and the opening of the delivery door from the weighing bucket are all in timed sequence or cycles, the period of which may be controlled or varied. In the drawings, this timing is illustrated by way of example as driven from a controllable constant speed motor actuating switches through an electric or electro-pneumatic transmission to permit the opening of the various delivery doors or gates and also to release the filled cans after the filling cycle is completed.

In one embodiment, the timing means alternately closes and opens energizing circuits first for the control means for the delivery gate of the hopper and then for the control means of the delivery gate of the weighing bucket, so that during one period of the cycle the gate of the delivery hopper may open and the gate of the weighing bucket must remain closed, and during the remaining period of the cycle the gate of the hopper must remain closed and the gate of the weighing bucket may open. During the period when the buckets are in raised position the hopper delivery door may open; when the scale beam is tilted by the weight of material in the weighing bucket, the opening circuit for the hopper door is broken and the door closed.

In one modification when the bucket is depressed by the measured weight of material, the delivery door of the bucket is opened by an impulse from the timing mechanism and remains open to discharge the weighed material, although the bucket rises immediately as the discharge of material begins. The discharged weighed material is received in flow control funnels from which it is delivered more slowly, thus enabling the vibrating apparatus to closely pack the material as it is delivered to the container. By varying the speed of the motor or timing means, the speed of weighing and filling the cans or containers may be varied to synchronize with the speed of a sealing or other processing apparatus.

In the embodiments shown by way of example, the scale beam and weighing buckets are mounted on a separate frame from the filling and vibrating and can moving apparatus thus eliminating the transfer of jars or vibrations to the scale beam or delicately adjusted weighing apparatus.

*Weighing unit*

Referring to the accompanying drawings, the weighing apparatus is mounted on a supporting frame or structure 11 of any suitable construction as, for example, of structural steel comprising a plurality of uprights 12 and 15 mounted on a suitable base member 16. On the upper ends of the uprights 12 and 15 and extending towards the front of the machine are horizontal beams 17 on which is fastened a transverse supporting beam or plate 18, Figs. 8 and 9, carrying a series of suitable weighing scale supports or standards 19. The upper ends of the supports 19 are forked lengthwise of the plate 18 to receive scale beams 20 and are provided with hardened upper surfaces 21, supporting knife edge fulcrums 22 of the scale beams 20. On one side of the fulcrums 22 the scale beam is bifurcated into spaced arms 23 and on the opposite side extends in an arm 24 carrying an adjustable weight 25. Outwardly projecting fulcrums 28 are mounted on the arms 23 and on these fulcrums are suspended hangers 29 of weighing buckets 30.

Each bucket has a wide rectangular aperture at the top with parallel side walls 34 and front and rear walls 38 parallel to each other at their upper part and diverging immediately therebelow to an enlarged dimension. Below this divergence, the bucket is divided into two separate outlet or delivery compartments 36 and 37, Fig. 10, by a chamber 39 containing, in the embodiment shown in Figs. 1 to 16 inclusive, an electromagnetic opening mechanism. The chamber 39 is open at its sides and slopes upwardly at the top to a ridge to divide and direct the incoming product into both outlets 36 and 37. The lower edges of the two outlets 36 and 37 are inclined upwardly from the front and rear walls of the bucket at a suitable angle as, for example, an angle of about 45°, and are enclosed in similarly inclined frames 45. The frames are extended inwardly from their upper inner edges below the chamber 39, and gates 46 are hinged to these extensions in position to open or close the outlets 36 and 37. Extending at nearly a right angle from each of the gates 46 are extensions or lugs 47 connected by slot and pin connection to a common gate actuating member 52. The member 52 is preferably weighted at its lower end and is pivotally suspended from a core or plunger 51 of an electro-magnet 50 mounted on the frames 45 within the chamber 39.

When the electro-magnet is energized by the passage of a current, the plunger 51 is drawn upward and both gates 46 are swung downwardly to open position as shown in Fig. 10. When the current is broken and the electro-magnet de-energized, the weight of the member 52 returns the gates to their normally closed position and presses the same tightly against the openings of the outlets 36 and 37, so as to support the product held in the bucket. The suspension of the weight 52 on the lugs 47 is such as to equalize the closing force on the gates to ensure a proper alignment of the gates and an equal division of closing pressure. The magnet 50 is located on the vertical line through the center of gravity of the bucket.

The tilting of the scale beam 20 serves to close alternate contacts of a mercury switch 55 mounted on the beam 20, and preferably immediately above the pivot point 22. This switch serves to contact between two wires at one end, when tilted in one direction and between two other wires at the opposite end, when tilted in the opposite direction and thereby to make and break alternatively two separate circuits. One pair of contacts of the beam switch 55 shuts off the hopper gate. The other pair of contacts serves to control delivery from the bucket. They will prevent a delivery, if the bucket has short weight, because the beam will not tilt under short weight. Delivery out of the bucket is controlled by impulse from timing device provided it has been filled sufficiently to tilt its beam arm downwardly.

To limit the swing or tilting of the beams, adjustable stop members or screws 56 are mounted on brackets or beams 57 forming a part of the supporting frame 11.

*Feeding and conveying unit*

The feeding and conveying unit comprises a hopper from which the material is delivered to the weighing buckets, a conveyor belt for conveying the cans and means for holding them properly spotted below their respective buckets to receive material therefrom while they are vibrated to compact the material, and then for permitting the filled cans to be conveyed therefrom by the belt, all in properly timed sequence. To isolate the vibrations and jarring necessarily incident to these various mechanisms from the scale beams and weighing apparatus, they are mounted on a separate frame 61.

The material to be weighed is contained in a hopper 62 mounted on the upper end of the frame 61 and supported on horizontal longitudinal beams 63 of the frame. The lower part or bottom of the hopper 62 opens into a number of individual spouts 64 having at their lower ends a delivery outlet closed by a swinging gate 65. Each spout 64 is enclosed in a mantle 66 that extends below the lower end of the spout and delivers into the upper end of its respective weighing bucket 30. The swinging gate 65 is swung to open position upon the energizing of an electromagnet 67 which thereupon attracts an armature plunger 68 connected to the gate 65 by means of a turnbuckle 69 and a link 70. The electromagnet may be mounted on a bracket 71 secured to one of the supporting beams 63. When the electro-magnet 67 is de-energized, the gate 65 is swung to closed position by means of a spring 72 confined between a stop 73 of the bracket 71 and a collar 74 adjustably mounted on a threaded extension 75 of the armature plunger 68.

The collar 74 is adjustably mounted on the extension 75 by means of an internally threaded tube 76 of collar 74 screwed onto the extension 75. The width of the opening from the spout 64 and thus the rapidity of flow of material into the weighing bucket may be adjusted by means of the turnbuckle 69. The electromagnet 67 is periodically energized and de-energized by a suitable electric control circuit to deliver material to the weighing bucket 30 after the latter has been emptied, and to stop said delivery when the bucket has received a predetermined weight of material and thus tilts the scale beams 20 as described above.

The material delivered from the weighing buckets 30 through the gates 46, drops into chutes 77, there being one chute for each weighing bucket, and from these chutes 77 the material drops into respective cans or containers 78 each of which has been brought to a receiving position under its respective chute. As shown in Fig. 7, each chute is provided with a conical member 79 mounted centrally of its respective chute on cross rods 80 so as to distribute the material toward the walls of the chute and avoid piling it in a heap in the center of its respective container. A frusto-conical flow control member 81 is threaded onto a vertical stem 82 depending from the cross rods 80 so that the flow through the funnel may be controlled by raising and lowering the member 81 from and toward the constricted lower end of the funnel. A lock nut 83 serves to maintain the member 81 in its adjusted position.

By means of the adjustable member 81 the delivery of material into the container 78 may be controlled irrespective of the speed of delivery of material from the weighing buckets 30. The deflecting cone 79 also serves to guard the threaded stem 82 from injury by the downwardly passing material. The funnels 77 may be mounted in the frame 61 in any suitable manner as, for example, between longitudinally extending horizontal rails or beams 84.

The cans 78 to be filled are supplied from a chute or inclined platform 85 delivering onto a conveyer belt 86, as shown at the right in Fig. 2 and the left in Fig. 3. The conveyer belt 86 passes about conveyer pulleys 87 mounted in the frame 61 in a direction from the chute or platform 85 beneath the funnels 77 and thus carries a series of empty cans or containers into position beneath the respective funnel.

As the cans are carried by the conveyer 86 below the funnels 77 each can is spaced to correspond to the spacing of the funnels 77, and when a number of cans corresponding to the number of funnels have thus been spaced and brought to position beneath their respective funnel, the series of cans is held in this position until filled with a weighed quantity of material, whereupon the cans are released to be conveyed from the unit and replaced by a succeeding series of cans.

For this purpose as each can 78 is carried on the conveyer belt 86, it comes into contact successively with an arm 88 of each of a series of wheels or turnstiles 89 mounted in frictionless bearings 90 on vertical journals 91 projecting upwardly from a longitudinal plate 92 of the frame 61. As shown in Figs. 13 and 14, the arms 88 of one wheel are offset vertically from the arms of each adjacent wheel so that they may rotate freely without interference. In order that each of the turnstiles will rotate in synchronism with each of the other turnstiles, they are inter-connected by idler gears 93, one between each turnstile, mounted on the plate 92 and meshing with the gears 94 secured or formed integral with each respective turnstile 89. It will thus be apparent that as each can 78 travels on the belt 86 in the direction of the arrow in Fig. 13, it encounters an arm 88 and, in passing, rotates it a quarter turn, thence comes successively into contact with the arms of successive wheels or turnstiles, thus being spaced the same distance as the spacings of the wheels or turnstiles 89. Sidewise displacement of the cans is prevented by a rail 95 secured to the frame 61.

One of the idler gears 93, as at 96, is provided with a recessed track 97 in which is mounted a lug or spaced lugs 98, which, when reaching a certain point of rotation, engage the end of a lever 99 pivoted on a horizontal pivot 100 and pressed by means of a spring 101 counter-clockwise so as to bring the end of the lever 99 into the track 97 in position to engage the stop or lug 98. When the stop or lug 98 engages the end of the lever 99, further rotation of the turnstiles is prevented and they are held stationary, holding their respective cans or containers stationary beneath their respective funnels 77.

It will be understood that the size of the idler gear 96 and the distance between the lugs 98 is so proportioned to the size of the gears 94 and the number of arms 88 as to permit a number of cans corresponding to the number of weighing buckets to be brought into position at one time. Thus, in the example illustrated in Fig. 13 in which there are six cans corresponding to six weighing buckets and each turnstile has four arms, the stops or lugs 98 are so positioned as to permit one and one-half rotations of the turnstiles between the successive stop lugs. When the respective cans thus positioned have been filled with the weighed material, the stop lever 99 is tilted to released position against the action of the spring 101 by means of an electro-magnet 102 acting on an armature plunger 103 connected by means of a link 104 to an extension 105 of the stop lever 99. The energizing and de-energizing of the electro-magnet 102 is controlled by the main timing circuit.

While each of the containers 78 is in position beneath its respective funnel 77, it is supported on a vibrating platform 106. Immediately beneath the belt 86 the platform 106 is supported at each end on bolsters 107. The bolsters 107 in turn rest on springs 108 carried in seat members 109 having downwardly extending stems 110 threaded into horizontal rails or brackets 111 of the frame 61. The springs 108 are positioned at their upper ends by means of downwardly depending lugs 112 on the bolsters 107 and at their lower ends by similar upwardly projecting lugs 113. This support for the bolsters 107 permits each bolster to move freely upwardly and downwardly throughout a limited amplitude and each bolster is held against longitudinal displacement by means of leaf springs 114 secured in horizontal position between the platform and cross beams 115, thereby permitting a vertical vibration of the platform.

The platform is vibrated at each end by means of eccentrically unbalanced shafts 116 and 117 in the bolsters at opposite ends of the platform. The shaft 116 is driven from a motor 118 by means of a belt 119 and the shaft 117 is driven from the shaft 116 by means of a sprocket chain 120 and sprocket wheels 121. The shafts 116 and 117 are eccentrically weighted by means of the weights 122 so that when rapidly driven by the motor 118, the momentum of the eccentrically mounted weights causes a rapid vibration at its respective end of the platform 106.

This vibration is transmitted through the belt 86 to the containers 78 and causes the material being delivered to these containers to pack closely in the can. The degree and force of the vibration may be adjusted by varying the weights 122 and the tension of the springs 108 by the adjustable stems 110.

*Control mechanism*

The motor 118 not only drives the belt 119 for the vibrating shaft 116 but also drives a timing device, which controls one electric circuit for timing the start of periods at which the gates 65 are opened for the delivery of material to the weighing buckets 30 and controls another circuit for timing the period during which the delivery gates 46 of the weighing buckets are open to deliver weighed material to the funnels 77 and the cans or containers 78 to be filled. The timing device driven by the motor 118, therefore, in conjunction with the scale beam switches 55 controls the delivery of material to the weighing buckets 30 and controls delivery from the buckets to the containers 78 in timed sequence. The timing mechanism also controls a circuit for energizing the solenoid 102 to release the stop lever 99 and the turnstiles 89 and thus to time the positioning and release of groups of cans to be filled. As these various mechanisms are timed from the motor 118 they may be simultaneously accelerated or retarded by adjusting the speed of the motor through a control device as, for example, the variable speed control 123. As the sole purpose of this control is to vary speed, any of the many known devices for this purpose may be employed equally well.

The timing device is driven from the motor 118 through a speed reduction mechanism comprising a worm 124 mounted on the shaft of the motor and meshing with a gear 125 which carries on its face a cam 126 and a pin 127. The cam 126 extends through a considerable angle of rotation on the gear 125 and periodically in each rotation of the gear 125, engages and lifts a tilting arm or lever 128 which carries a suitable switch such as a mercoid switch 129 for controlling control circuits for actuating the electromagnets 50 of the weighing buckets and 67 of the delivery spouts.

Figure 15:
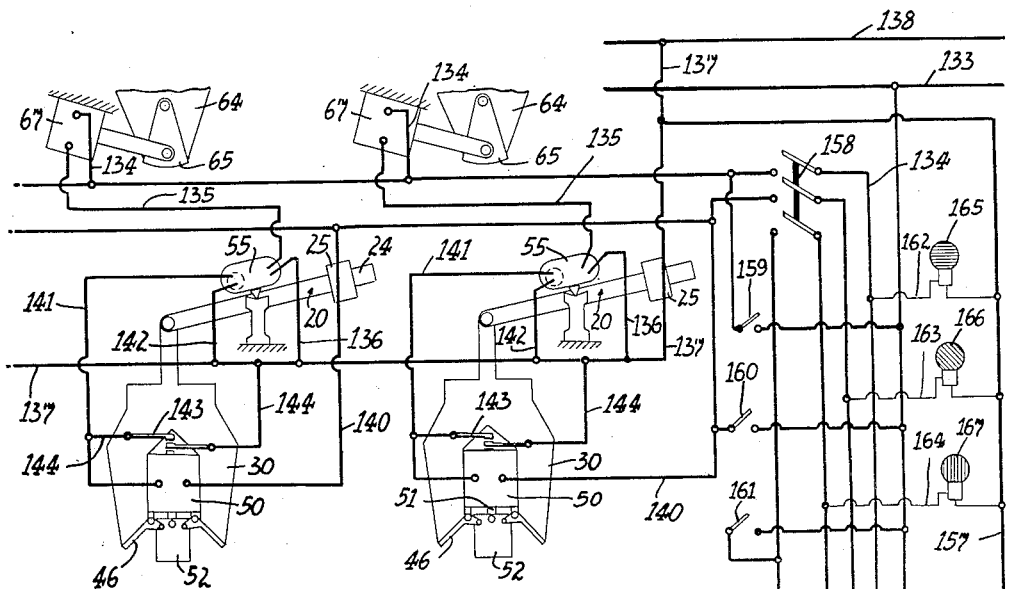
Fig. 15 is a diagrammatical arrangement of the operative features of the weighing machine and its inter-connection with part of a closing or sealing machine.

These electric circuits are shown diagrammatically in Fig. 15. Each end of the mercoid switch 129 is connected through branch wires 130 and 131 to a conductor 132 extending from a main wire 133. When the tilting lever 128 is released from the cam 126 and drops to the position shown in Fig. 15, contact is made between the branch wire 130 and wire 134 connected through branches to the solenoids 67, thereby connecting one terminal of each solenoid to the main 133. From the other terminal of the solenoids connecting wires 135 lead to one end of each mercoid switch 55 on the respective weighing beam 20 corresponding to the electro-magnet 67 and spout 64.

When the weighing bucket 30 is empty and in its uppermost position, the wire 135 is connected to a branch 136, one for each mercoid switch 55, and connecting the latter to a main branch 137 leading to the main 138 opposite the main 133. As this completes the circuit, the solenoid 67 is energized and the gate 65 is opened. When a predetermined quantity of material has entered the bucket 30, the latter tilts the scale beam 20, thus breaking the circuit through the mercoid switch 55 and de-energizing the electromagnet 67, whereupon the gate 65 is closed by the spring 72. The rate of passage of material through the gate 65 is so adjusted that the scale beam 20 and the mercoid switch 55 will tilt before the cam 126 of the timing gear 125 engages the lever 128. When the cam 126 lifts the lever 128, it tilts the mercoid switch 129 and breaks the circuit so that if the scale beam 20 tilts back to empty position, the circuit will not be completed through the solenoid 67 to open the gate 65 until the timing cam 126 has rotated sufficiently to release the lever 128.

When the cam 126 lifts the lever 128 it tilts the switch 129 so as to connect the branch wire 131 to a conductor wire 139 leading through branches 140 to a terminal of the electro-magnet 50 and connecting this terminal to the main 133. The circuit is completed from the opposite terminal of the electro-magnet 50 through a connector 141 leading to the opposite end of the weighing beam switch 55 from that of the wires 135 and 136.

When the beam 20 and switch 55 are tilted by a completely filled weighing bucket 30, as shown in Fig. 15, contact is established by the switch between the conductor 141 and branch circuits 142 to the return branch 137 and the main 138. Thus a circuit is established through the switches 129 and 55 through the electro-magnet 50; thereupon the plunger 51 is lifted and the gates 46 are opened, delivering the weighed material from each bucket into its respective funnel 77 and thence into the containers 78. As the plunger 51 rises, it closes a switch 143 in a by-pass circuit 144 connecting the wire 141 directly to the wire 137 so that the circuit through the solenoid 50 will be maintained as the empty weighing bucket 30 rises and the tilting of the weighing beam 20 breaks the circuit through the switch 55. The solenoid 50 thus remains energized and the gates 46 open, even after the circuit is broken through the switch 55. When, however, the cam 126 releases the lever 128 and the circuit is broken in the switch 129 between the wires 130 and 131, the electro-magnet 50 becomes de-energized, the plunger 51 drops and the switch 143 is thereby opened. The gates 46 are thus immediately closed at the time that the cam 126 closes the circuit through the electro-magnets 67 to open the hopper spout gates 65.

The switch 143 may be of any suitable type such, for example, as shown in Fig. 12, and in this example comprises a pair of terminals 145 positioned to be bridged by a contact member 146. The contact member 146 is mounted on an insulating body 147 which latter is pressed downwardly away from the contact terminals 145 by means of a spring 148. When, however, the plunger 51 is lifted, it engages a downward extension 149 of the insulating member 147 and lifts the latter upwardly until it contacts with the contact terminals 145. The terminals 145 may be mounted on an insulating plate 150 supported above the housing of the electro-magnet 50 by suitable uprights 151.

The pin 127 on the control gear 125 is positioned radially inwardly of the cam 126 so that it does not engage the control lever 128, but it extends sidewise beyond the cam 126, as shown in Fig. 3, to engage at a point in its rotation and press downwardly a lever 152 against the action of a retaining spring 153. When the lever 152 is thus depressed, it tilts a switch 154, preferably of the mercoid type, connected by means of a conductor 155, at the end thus lowered, with the main 133. As the switch 154 is thus tilted downwardly, it connects the wire 155 with a conductor 156 leading to the electro-magnet 102. The electro-magnet 102 is connected by a conductor 157 to the opposite main 138.

Thus, when the pin 127 contacts the lever 152 and energizes the solenoid 102, it tilts the stop lever 99 and releases the turnstiles 89 and the series of cans held by them.

Figure 16:
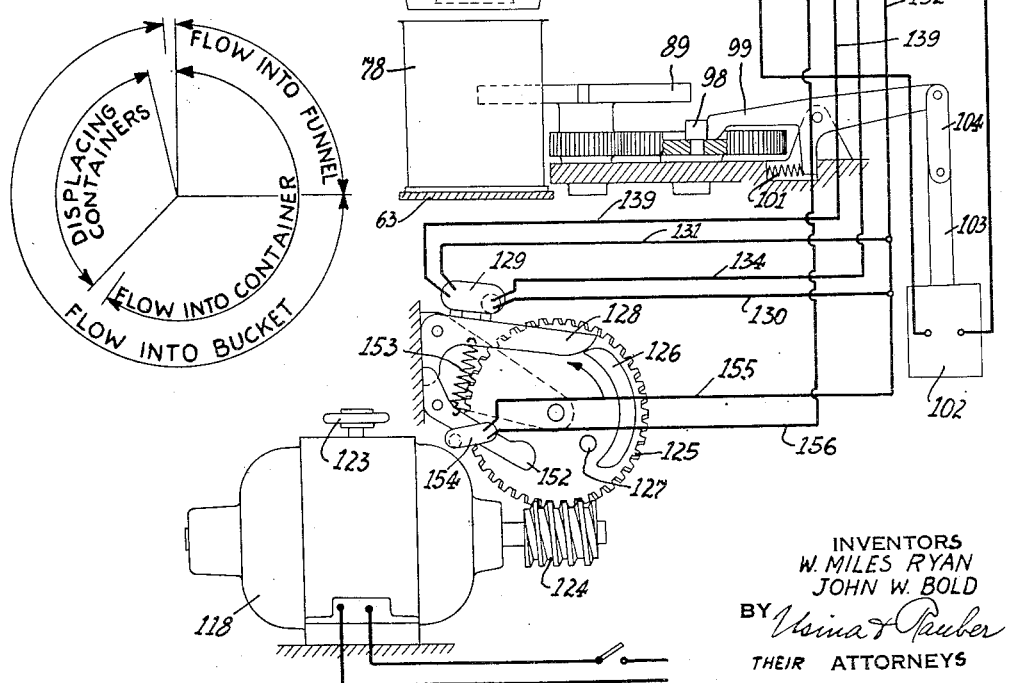
Fig. 16 is a diagram illustrating the time relations within a cycle of operation.

Inasmuch as the flow of material through the funnels 77 is controlled by the control member 81, the flow into the container does not necessarily terminate when the flow from the bucket into the funnel terminates, but may lag as shown in the diagram in Fig. 16. Thus, taking this diagram in clockwise direction starting at the top, the flow of material from the bucket into the funnel and from the funnel into the container starts simultaneously, but the delivery from the bucket is much quicker than from the funnel and terminates sooner. Then delivery of material from the spout 64 into the bucket starts and is maintained at a relatively slow rate to permit accurate weighing, while the flow from the funnel into the container continues and is terminated and while the containers are released and replaced by a succeeding group. This permits the maximum time for each operation without interfering with or slowing down the operation of any other part. It enables the material to be fed into the weighing buckets slowly so as to minimize the effect of its momentum, and also makes possible a slow feed of material into the containers so that it may be compacted therein by the vibration of the latter during filling.

It is also to be noted that inasmuch as a number of containers are being filled with weighed material at a single time, the speed of filling of the containers is correspondingly multiplied over that possible without this group weighing, and thus the number of containers filled in a given period of time may be made as large as desired without cutting down the weighing time for each individually weighed quantity.

The timing circuits may all be simultaneously broken or opened to prevent further operation of the various electro-magnets and thus stop the apparatus by means of a triple switch 158 having three blades, one each for each of the conductor wires 134, 139 and 156 so that by opening this switch, actuating current may be cut off from the electro-magnets 50, 67 and the electro-magnet 102. Thereupon the gate 65 of the hopper 64 is immediately closed or maintained closed by the spring 72 and the gates 46 of the weighing bucket are closed or maintained closed by the weight 52. If the switch 158 is open when the weighing bucket is partly filled, the gate 65 may be temporarily opened by closing a switch 159 in a by-pass circuit between the wire 132 and the wire 134, thereby passing current directly from the main 133 to the branch wire 134. Thereupon the gate 65 will be open until the predetermined weight of material is fed into the buckets 30 sufficient to tilt their respective weighing beams 30 and open the switch 55.

The gates 46 of the weighing bucket may then be opened to discharge the contents of the buckets by closing a switch 160 in a branch circuit connecting the wire 132 to the wire 140. The electro-magnet 50 will then be energized, opening the gates 46 and permitting the discharge of material to the funnels 77. The circuit to the can release electro-magnet 102 may similarly be energized by closing a switch 161 in a circuit between the wire 132 to the conductor 156, thereby by-passing current directly from the main 133 to the electro-magnet 102, whereupon the can release lever 99 is tilted to release the turnstiles 89. In this way, the weighing bucket may be emptied after discharging the predetermined quantity or weight of material and the cans cleared from the apparatus after which the switches 159, 160 and 161 are opened. In order that the operator may know when the electro-magnets 67, or the electro-magnets 50, or any of them, or the electro-magnet 102 are energized, branch circuits 162, 163, 164, respectively, having suitable lamps 165, 166, 167, are inserted between the conductor 157 and the conductors 134, 139 and 156, respectively.

Should any material be spilled by improper or poor operation of the various switches, it will be received in a collector pan 168 below the belt 86 and having a suitable outlet 169.

*Modified apparatus*

In the modified embodiment of the invention shown in Figs. 17 to 29 inclusive, the features of construction are similar to those in the embodiments shown in Figs. 1 to 16 inclusive, and have, therefore, the same reference characters, and as to these the description given above applies.

The can feeding mechanism of the apparatus has been modified, however, to provide a front line feed, that is, one in which a line of cans is fed front face, or at a right angle to their alignment into position to receive the weighed material and thereafter the filled cans are fed onto a traveling conveyor on which they move in a single file, that is, in the same direction as the alignment of the cans.

The control for the weighing buckets and the mounting and actuation of the control switch and mechanism have also been modified in the interest of greater sensitiveness.

Referring first to Figs. 17 to 20, several parallel series of cans are fed from the supply chute 85, as described in connection with Figs. 1 to 6, onto an endless conveyor belt 170, which is carried on a number of pulleys or rollers 171 suitably supported in brackets 172 on the frame 61. The mounting of the supply chute or platform 85 is at right angles to its position in Fig. 2, and the belt 170 is of a width equal to the overall length of all of the funnels 77 and, therefore, sufficiently wide to take an entire line of cans in a broadside or front face formation and to carry them below the row of funnels 77 and onto the belt 86 for delivery to the can capping machine.

The platform 85 is preferably provided with dividing partitions or walls 173 to guide the cans of each series in single file on to the belt conveyor 170.

The movement of each row of cans on the conveyor belt 170 is so controlled by an escapement mechanism that each row of cans is brought directly below the row of funnels 77 and stopped in position thereunder during the period when the weighed material is delivered from the funnels 77 and then is released to pass to the conveyor belt 86.

The escapement mechanism comprises a series of curved or bent escapement levers 174, one lever for each can; these levers being mounted on partition rails 175 extending between each series of cans conveyed on the belt 170 and the levers being pivoted on vertical pins 176 so that when rocked one or the other arm of the lever swings into or out of the path of the cans being conveyed.

To provide this swinging movement for the control escapement levers 174, the latter are provided with upwardly projecting pins 177 which enter into slots 178 on a transverse actuating rod 179. The actuating rod is in turn connected through a link 180 to the stem of an armature plunger 181 actuated in one direction by an electromagnet 182, and in the opposite direction by a spring 183 (Fig. 17).

When the actuating rod 179 is moved in one direction, as shown in Fig. 22, it rocks the levers 174 in a position to throw one arm into the path of oncoming cans and the other arm in a position to release a preceding can.

When the rod 179 is shifted in the reverse direction the obstructing arm of the lever 174 is moved out of the path of the oncoming can so as to permit it to move but it is then retained by the opposite arm which has moved into a retaining position, as shown in Fig. 21.

Each time the actuating rod 179 moves back and forth one row of cans is released to be carried by the belt 170 below the funnels 77. Each can released by its respective lever or detent 174 is carried by the belt 170 between the guide rails 175 until it is stopped by a second bent detent or lever 184 mounted on the guide rail 175 on the opposite side of the can from the wall supporting the detent 174. The detents or levers 184 are in reverse position to the detents 174 and are mounted on vertical pivots 185. As the can comes into contact with the projecting detent 184, as shown in Fig. 21, it is stopped and is then in position below its respective funnel 77. While retained in this position it receives material discharged by its respective weighing bucket.

When the can is filled the detent 184 is rocked so that the detaining arm moves out of the path of the can and permits the latter to be carried by the belt 170 until it is stopped by the other end of the detent or lever which has now moved to the position shown in Fig. 22. As it remains in this position a succeeding can is carried by the belt 170 until it is stopped by contact with the retained can whereupon the detent 184 returns to the position shown in Fig. 17 releasing the filled can and holding the succeeding can in position for filling.

The detents 184 are actuated by means of an actuating rod 186 through a pin and slot connection similar to that of the detents 174. The rod 186 is synchronized with the movement of the rod 179 by means of connecting levers 187 pivoted on the supporting frame and connected at one end to the rod 186 and at the other end to the rod 179 and link 180. The electromagnet 182 is energized and de-energized at the proper intervals by a suitable timing circuit.

As diagrammatically shown in Fig. 19, the conveyor belt 170 is vibrated below the cans by means of a vibrating table 106 and associated mechanism as the cans receive the weighed material.

The various conveyors and timing mechanism for the weighing and feeding apparatus are driven in synchronized or timed relation to a sealing or other machine 188 by being driven from a common motor 189 through a speed reduction means 190 and shaft 191. The sealing machine 188 is of any suitable construction and need not be described in detail other than that a turnstile 192 is positioned to take cans individually from the conveyor 86 and pass them to the capping or sealing or other apparatus.

The belt conveyor 86 is driven from a shaft of the sealing machine through a bevel gearing 193 on an extension of the shaft of an adjacent pulley 87. The belt conveyor 170 is similarly driven through a bevel gear 194 from another pulley of the belt conveyor 86.

It will be understood that the embodiment shown in Figs. 1 to 16 may be similarly connected to a synchronized capping or sealing machine.

In the embodiment shown in Figs. 24 and 25, a pneumatic actuating means is employed, in which there is no connection between the weighing bucket and any fixed part until the former reaches its lowest position.

In this embodiment the electromagnet 50 of the gate actuating mechanism is replaced by a pneumatic cylinder 195 and piston 196 which latter is weighted and connected to the gates 46 similarly to the armature plunger 51.

The upper end of the cylinder 195 is connected through a tube or passage 197 to a downwardly opening suction cap 198 which is open to the air until the bucket 30 reaches its lowermost position whereupon the edges of the cap contact with a horizontal plate or bracket 199 mounted on the lower end of the spout 66. When the suction cap thus contacts with the bracket 199, it closes communication between the pipe or passage 197 and a branch pipe 200 leading to a suction main 201. Each of the buckets is thus provided with a passage 197 positioned to communicate with a branch 200 and be connected with the suction main 201.

When the latter is subjected to suction each of the pistons 196 is drawn upwardly by the suction, opening the gates 46. The suction on the suction disc 198 serves to hold the bucket 30 in its lowermost position until suction is relieved from the main 201.

The suction main 201 leads through a pipe 202 to a control valve 203 by which it is placed alternatively and at properly timed intervals in communication with a suction pipe 204 leading to a suitable suction means such as the vacuum pump 205 in Fig. 17, and to the atmosphere through a suitable vent 206 in the valve. Normally a valve member such as the piston 207 is pressed by a spring 208 mounted about the stem 209 of the piston to a position placing the pipe 202 in communication with the vent 206. The valve stem 209 is secured, however, to the plunger 210 of an electro-magnet 211 energized at timed intervals by a timing circuit.

In the modification of the invention shown in Figs. 26 and 27 the scale beam switch 55 of Figs. 8 and 9 is replaced by a switch 212 on a holder 213 pivoted on a support 214 independently of the scale beam 20. The holder 213 has a depending hook-shaped member 215 positioned to be engaged by the end of the scale beam arm 24 when the latter reaches its lowermost position corresponding to the raised empty position of the scale bucket 30. When, however, the arm 24 is lifted by the filling of the weighing bucket, its weight released from the hook 215 permits the holder 213 and switch 212 to tilt from the position shown in Fig. 26 to that indicated diagrammatically in Fig. 28.

In the modification shown in Fig. 24 the hopper gate magnet and spring arrangement 67 and 72 is replaced by a pair of electromagnets 216 and 217 respectively, and a double throw switch 218. The switch 218 is pivotally mounted on a pedestal 219 on a bracket 220 extending from the skirt 66 of the hopper spout 64, and also has a depending arm 221 the lower end of which is enclosed between a pair of collars 222 adjustably mounted on a horizontal sliding armature rod 223 projecting through the magnets 216 and 217. As the rod 223 is shifted in one direction or the other by the action of the electromagnets 216 and 217, it tilts the switch 218 in one direction or the other. A dead center spring 224 tensioned between the bracket 220 and a point on the switch 218 above its fulcrum serves to hold the switch in either position of tilting until again shifted by the armature rod 223. The rod 223 is connected through the turnbuckle 69 to the swinging gate 65 in the same manner as in Fig. 4.

The timing mechanism is driven from the shaft 191 which drives the canning or sealing mechanism 188 and thus ensures synchronism between the weighing apparatus and the sealing or capping apparatus. The motor 189 and the speed reduction means 190 may control the speed of the canning and weighing mechanism. The timing mechanism comprises a cam 226 keyed onto the shaft 191 and positioned to engage and lift the lever arm 128 for a definite period with each revolution of the shaft 191 similar to the lifting of the lever arm 128 of Fig. 15. As shown in Fig. 29, the cam 226 carries an adjustable member 227 adjustably secured by means of a screw 228 so that the face of the lifting part of the cam may be extended circumferentially to adjust the period of time or the rotation of the shaft 191 during which the lever 128 is lifted. As in the case of the cam 126, Fig. 15, the cam 226 lifts the lever 128 during the period when the material is to be discharged from the weighing bucket 30, and lowers the lever 128 during the period when material may be discharged from the hopper spout 64. The cam 226 also carries a pin 229 positioned to engage and depress the lever 152 for a short period in its cycle of rotation and thus to actuate the can feeding mechanism. The pin 229 is adjustably mounted in an arcuate slot 230 so that the timing of the can feeding mechanism may be adjusted.

When the cam is in position to permit the lever 128 to tilt downwardly, as in Fig. 28, the mercoid switch 129 carried on the lever connects the wires 130 and 134 in a manner similar to the apparatus of Fig. 15 and thus, through branches 231, connects a terminal of the hopper gate opening electromagnet 216 to the main 133. The opposite terminal of the electromagnet 216 is connected to a terminal of the switch 218 and, when the switch is in the closed position shown in Fig. 28, is connected through a conductor 232 to the scale beam switch 212. When the switch 212 is in the position shown in Fig. 26, the conductor 232 is connected to a branch 233 leading through the branch 137 to the opposite main 138. The opening electromagnet 216 is energized by the circuit thus closed and opens the discharge gate 65. Immediately upon its opening, the shifting of the armature rod 223 and collars 222 tilts the switch 218 to the opposite position from that shown in Fig. 28 and thus breaks the circuit through the electromagnet 216. The gate 65 remains open, however, until the closing electromagnet 217 is energized.

When the filling of the weighing bucket 30 is sufficient to cause the scale beam 20 to tilt to the position shown in Fig. 28 and thus permit the switch 212 to tilt, a circuit is established between the conductor 134 leading from the main 133 through the switch 218 (which is now tilted in the opposite direction from that shown in Fig. 28), thence through the electromagnet 217 to a connecting conductor 234 to the closed end of the switch 212 and thence through a conductor 235 to the wire 137 and the opposite main 138.

The energizing of the closing electromagnet 217 instantly closes the gate 65 and also restores the switch 218 to position to again permit the electromagnet 216 to be energized. It is obvious that the opening and closing of the gate 65 can only take place when the branch 134 is connected to the branch 133 through the switch 129 when the latter is in the position shown in Fig. 28, and thus the gates 65 cannot be opened or closed during the discharge period of the weighing buckets 30.

The switch 218 acts to de-energize each magnet after it has moved its armature rod, and thus leaves the other electromagnet free to actuate the armature rod when it is in turn energized.

It will be understood that the rate of discharge from the hopper spout 64 is, in each case, sufficiently rapid to fill the weighing buckets 30 sufficiently to tilt the scale beams 20 before the lever arm 128 is engaged and lifted by the cam area of increased diameter. When the lever 128 is thus lifted, connection between the wires 130 and 134 is broken and is simultaneously established between the conductors 131 and 139, thus connecting one terminal of the vacuum control electromagnet 211 to the main 133. The other terminal of the electromagnet 211 is connected to the opposite main 138 through the conductors 141 and branch 137. The energizing of the electromagnet 211 immediately moves the piston valve element 207 of the valve 203 to connect the suction main 201 to the suction pipe 204.

If the weighing bucket 30 is now sufficiently lowered to bring the suction cap 198 into contact with the plate 199, the actuating piston 196 is lifted by the suction effect, opening the gates 46. The gates 46 remain open until the rotation of the cam 226 is sufficient to permit the lever 128 to drop, breaking communication between the conductors 131 and 139, de-energizing the electromagnet 211 and thus causing the spring 208 to shift the valve element 207 to close communication between the suction main 201 and the suction pipe 204 and open the suction main to the atmosphere. This releases the piston 196 and also releases the suction disc 198 from the plate 199 and enables the weighing bucket to rise.

It is impossible for the electromagnet 216 to be energized while the scale beam 20 is tilted because the circuit is then broken at the switch 212. Consequently the hopper discharge gate 65 cannot be opened while the weighing bucket 30 is discharging or is in lowered position. It will be understood that the rate of discharge from the weighing bucket 30 is sufficiently rapid to completely discharge the bucket before the cam rotates sufficiently to permit the lever 128 to again be lowered.

During the rotation of the cam 226 and while the lever 128 is still in lowered position, the pin 229 engages and depresses the lever 152 and tilts the switch 154. Communication is established through the switch 154 between the branch wire 132 and a connecting conductor 236 leading to the can feeding actuating electromagnet 182. The opposite terminal of the electromagnet 182 is connected through a branch wire 237 to the wire 137 and the opposite main 138. The electromagnet is thereby energized for a short period while the lever 152 is depressed, and de-energized as soon as the lever 152 is lifted by its spring 153. This energizing and de-energizing of the electromagnet 182 causes a shifting back and forth of the actuating rods 179 and 186 and thus releases a row of cans for movement to receiving position for each cycle of the cam 226. The wiring and timing circuit of the modification in Fig. 28 is provided with the switches 158, 159, 160, and 161, and lamps 165, 166 and 167 as in the embodiment shown in Fig. 15.

Through the above invention a weighing mechanism is provided in which a large number of containers may be quickly filled with an accurately weighed quantity of material while, at the same time, permitting each bucket to be filled at a relatively low rate so that the weighing is not interfered with by the momentum of the falling stream of material.

The accuracy of weighing is also increased by the sensitiveness of the scale beam and its freedom from vibration or from retarding or deadening influences.

The mechanism is so timed that all of the parts or elements may be simultaneously speeded or retarded so that it may be easily and accurately brought into synchronism with the apparatus to receive the filled containers as, for example, a capping or sealing apparatus.

The apparatus shown in Fig. 1 has the advantage also that the weighing bucket may be quickly discharged and may discharge while rising without dumping the material too rapidly into the container, and that the cycles of emptying and filling the weighing bucket and of filling and moving the containers or cans may overlap so that a prompt and quick discharge of the buckets and a slow filling of them may be combined with a slow feeding of the weighed material to the containers, thereby enabling the latter to be gradually filled without spilling and while permitting the material to be compacted. The vibration of the cans during filling is of advantage with certain materials as, for example, granular or solid materials which pack more tightly upon being vibrated. The spacing of the cans while being vibrated prevents impacts between adjacent cans that would affect the vibration and damage the rims of the cans. It may be dispensed with, however, in weighing or measuring readily fluid materials which pack without vibration, or in filling materials where close packing is not required.

It will also be obvious that certain modified elements may be employed as units in place of others in the combination.

What we claim is—

1. Apparatus of the type described which comprises weighing mechanism having a series of independently actuated weighing buckets and discharge means therefor, individual supply means for each of said buckets, means to close said supply means when said buckets have a predetermined weight of material and timed means to actuate said discharge means simultaneously, means actuated by predetermined weight of material in said buckets to control said discharge means, and means to move a series of containers corresponding to said series of weighing buckets into position to receive material from said buckets between each discharging interval in timed cyclic sequence.

2. Apparatus of the type described which comprises weighing mechanism having a series of independently actuated weighing buckets and discharge means therefor, individual supply means for each of said buckets, means controlled by the weight of material in said buckets to close said supply and to open the discharge of said buckets when said buckets have a predetermined weight of material, means to move a series of containers corresponding to said series of weighing buckets into position to receive material from said buckets between each discharging interval, means to time said discharges and move said containers in timed cyclic sequence, and means to adjust the periods of said cycles.

3. Weighing and filling mechanism which comprises a weighing means, means operable by said weighing means when filled with a predetermined weight of material to interrupt the supply of material to said weighing means and to permit discharge of the weighed material therefrom, electric circuits actuating said means to interrupt the supply of material and to permit the discharge of weighed material for the closing of said supply and the discharge of the weighed material, and a timing mechanism independent of said weighing mechanism for opening and closing said respective circuits in predetermined timed cycles.

4. Weighing and filling mechanism which comprises a weighing mechanism actuated by a predetermined weight of material, means to discharge material to be weighed to said weighing mechanism, means comprising an electric circuit controlled by said weighing mechanism to close the supply of material to said weighing mechanism, means comprising a second circuit to control the discharge of weighed material from said weighing mechanism, and a timing mechanism independent of said weighing mechanism for determining successive cycles within which each of said circuits is operable.

5. Weighing and filling mechanism which comprises a weighing mechanism actuated by a predetermined weight of material, means to discharge material to be weighed to said weighing mechanism, means comprising an electric circuit controlled by said weighing mechanism to close the supply of material to said weighing mechanism, means comprising a second circuit to control the discharge of weighed material from said weighing mechanism, a timing mechanism independent of said weighing mechanism for determining successive cycles within which each of said circuits is operable, and separate manually operable switches for each of said circuits.

6. Weighing and filling mechanism which comprises a weighing mechanism actuated by a predetermined weight of material, means to discharge material to be weighed to said weighing mechanism, means comprising an electric circuit controlled by said weighing mechanism to close the supply of material to said weighing mechanism and means comprising a second circuit to control the discharge of weighed material from said weighing mechanism, a timing mechanism independent of said weighing mechanism for determining successive cycles of predetermined intervals within which each of said circuits is operable, and means for continuously moving containers through position to receive weighed material from said weighing mechanism and for detaining said containers for a timed interval in position to receive weighed material, and an electric circuit controlled by said timing mechanism to actuate said detaining means.

7. Weighing and filling mechanism which comprises a weighing mechanism actuated by a predetermined weight of material, means to discharge material to be weighed to said weighing mechanism, means comprising an electric circuit controlled by said weighing mechanism to close the supply of material to said weighing mechanism, means comprising a second circuit to control the discharge of weighed material from said weighing mechanism, a timing mechanism independent of said weighing mechanism for determining successive cycles of predetermined intervals within which each of said circuits is operable, means for continuously moving containers through position to receive weighed material from said weighing mechanism and for detaining said containers for a timed interval in position to receive weighed material, an electric circuit controlled by said timing mechanism to actuate said detaining means, and manually operated switches for each of said circuits.

8. Weighing and filling mechanism which comprises a weighing mechanism actuated by a predetermined weight of material, means to discharge material to be weighed to said weighing mechanism, means comprising an electric circuit controlled by said weighing mechanism to close the supply of material to said weighing mechanism, means comprising a circuit to control the discharge of weighed material from said weighing mechanism, a timing mechanism independent of said weighing mechanism for determining successive cycles of predetermined intervals within which each of said circuits is operable, means for continuously moving containers through position to receive weighed material from said weighing mechanism and for detaining said containers for a timed interval in position to receive weighed material, an electric circuit controlled by said timing mechanism to actuate said detaining means, and manually operated switches for each of said circuits, each circuit having an indicator to indicate an operative condition.

9. A weighing and filling mechanism having a movable weighing element, a pair of separate circuits, a switch movable by said weighing element to opposite positions alternatively to close one of said circuits and open the other, means controlled by one of said circuits to supply material to said weighing mechanism and by the other of said circuits to discharge weighed material from said weighing mechanism, and a timing mechanism independent of said weighing mechanism to open and close said circuits alternatively in predetermined timed recurrent cycles.

10. A weighing and filling mechanism having a movable weighing element, a pair of separate circuits, a switch movable by said weighing element to opposite positions alternatively to close one of said circuits and open the other, means controlled by one of said circuits to supply material to said weighing mechanism and by the other of said circuits to discharge weighed material from said weighing mechanism, a timing mechanism independent of said weighing mechanism to open and close said circuits alternatively in timed predetermined recurrent cycles, and means controlled by said timing mechanism to move containers in position to receive weighed material at intervals co-ordinate to the discharge of weighed material from said weighing mechanism.

11. Automatic weighing mechanism which comprises a scale beam, a weighing bucket on one arm of said scale beam, a pair of electric circuits, an electric switch tiltable in opposite directions by the tilting of said scale beam and operative in opposite positions of said switch to alternately open and close said circuits, means controlled by the alternative opening and closing of said circuits to supply material to and to discharge weighed material from said weighing bucket, and a separate timing mechanism operative independently of said scale beam to open and close each of said circuits at cyclicly timed predetermined intervals.

12. Weighing and filling mechanism which comprises a weighing bucket, means to supply material to be weighed to said bucket, means operable by a predetermined weight of material in said bucket to interrupt said supply of material thereto, means for opening and closing said bucket comprising an electric circuit and a pair of circuit breakers in series therein, means to close one of said circuit breakers when a predetermined quantity of material is in said bucket and a continuously driven timed mechanism independent of said bucket to close the other of said circuit breakers in uniform recurrent cycles.

13. Weighing and filling mechanism which comprises a weighing bucket, means to supply material to be weighed to said bucket, means operable by a predetermined weight of material in said bucket to interrupt said supply of material thereto, means for opening and closing said bucket comprising an electric circuit and a pair of circuit breakers in series therein, means to close one of said circuit breakers when a predetermined quantity of material is in said bucket and a timed mechanism to close the other of said circuit breakers and a by-pass circuit about said first circuit breaker and means for closing said by-pass circuit when said opening mechanism is operated.

14. Weighing and filling mechanism which comprises a weighing bucket, a hopper supply material to be weighed to said weighing bucket, said hopper and weighing bucket having discharge gates, means comprising an electric circuit for opening and closing said hopper gate, means comprising an electric circuit for opening said bucket gate, a timing mechanism comprising an electric switch and a pair of alternate circuits alternately closed by said switch, one of said circuits comprising in series the circuit of the hopper gate closing and opening means, the other of said alternate circuits in series with the circuit of said bucket gate opening means, and a switch controlled by the lowering of said bucket to open and close, respectively, the circuit of said hopper gate closing and opening means and the circuit of said bucket opening means.

WILLIAM MILES RYAN.
JOHN W. BOLD.

CERTIFICATE OF CORRECTION.

Patent No. 2,100,874.                               November 30, 1937.

WILLIAM MILES RYAN, ET AL.

It is hereby certified that error appears in the printed specification of the above numbered patent requiring correction as follows: Page 10, first column, line 4, claim 14, for "supply" read supplying; and that the said Letters Patent should be read with this correction therein that the same may conform to the record of the case in the Patent Office.

Signed and sealed this 8th day of February, A. D. 1938.

(Seal)

Henry Van Arsdale,
Acting Commissioner of Patents.